Jan. 3, 1967     D. P. CORCORAN     3,295,226

ELECTRONIC TRAINING AIDS

Filed Sept. 8, 1964

INVENTOR.
DESMOND P. CORCORAN
BY Kimmel & Crowell
ATTORNEYS.

United States Patent Office 3,295,226
Patented Jan. 3, 1967

3,295,226
ELECTRONIC TRAINING AIDS
Desmond P. Corcoran, 3408 Pierce,
El Paso, Tex. 79903
Filed Sept. 8, 1964, Ser. No. 394,715
5 Claims. (Cl. 35—19)

The present invention relates to teaching aids generally and in particular to a device for teaching the values and characteristics of electrical circuits including resistors and the like.

A primary object of the present invention is to provide a teaching aid which enables an instructor to illustrate and explain a plurality of electrical circuits to show how each functions with the reasons for the functions shown visually on the device for the benefit of the students being trained.

Figure 1:
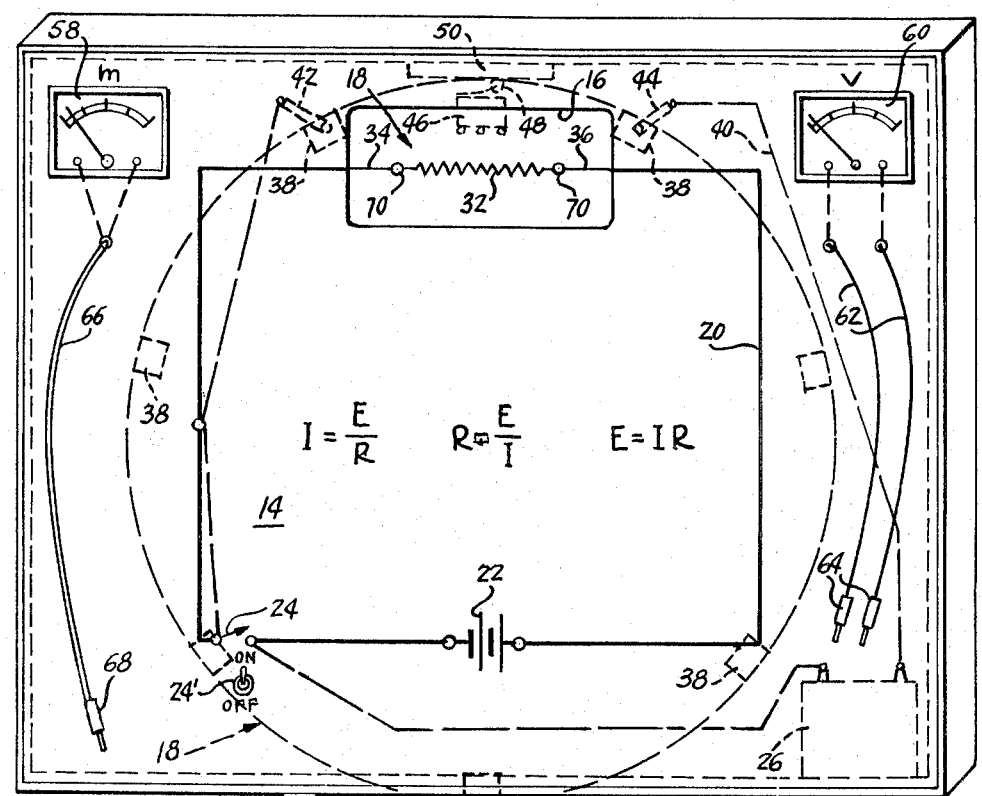
Figures 2, 3:
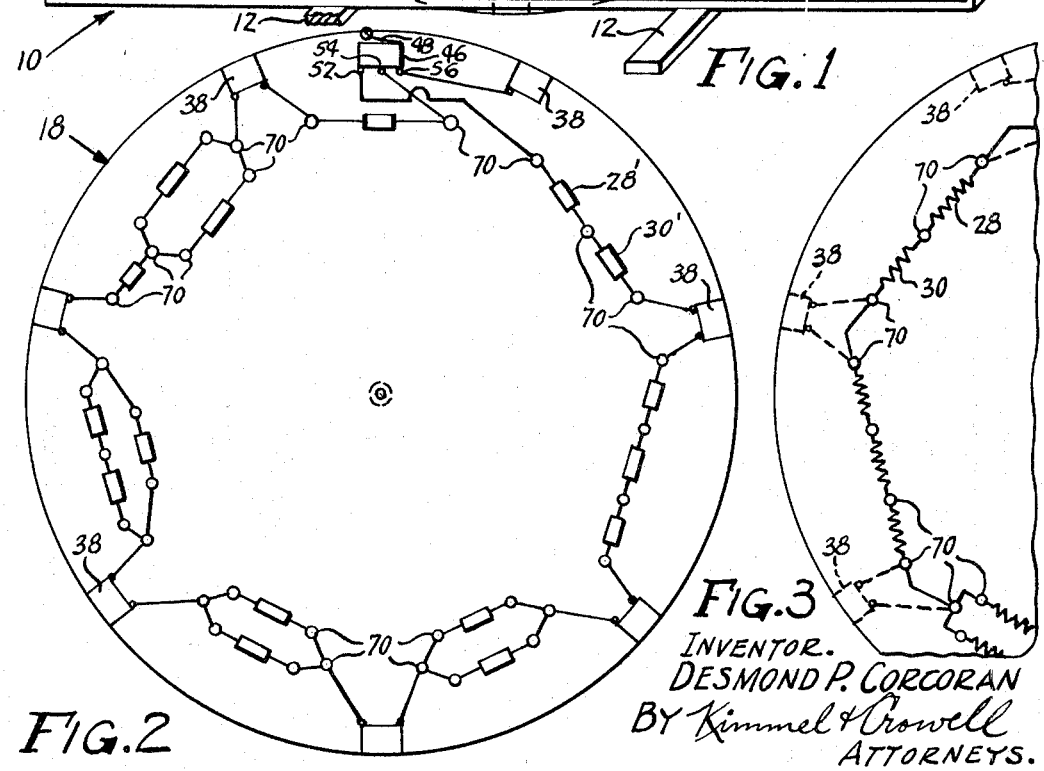

Another object of the present invention is to provide a teaching device which may be used hung on a wall, standing on a table, one which may be used as a table if desired, one neat in appearance and of unitary construction, and one which is economically feasible. These and other objects and advantages of the invention will be completely understood from the following description when taken in connection with the annexed drawing, in which:

FIGURE 1 is a perspective view of the invention as seen from the front with a portion of one of the supporting stands broken away, FIGURE 2 is an elevational view of the rear face of a disc mounted in the device shown in FIG. 1, and FIGURE 3 is a fragmentary view of the front face of the disc shown in FIG. 2.

Referring in detail to the drawing in which like numerals indicate like parts in the several views, the teaching aid of the present invention includes a housing 10 supported upon legs or standards 12 one of which is broken away in FIG. 1. The front face 14 of the housing has an opening 16 through which may be viewed a portion of the periphery of a disc 18 which is rotatably mounted within the housing 10.

The front face 14 also carries indicia in relatively heavy lines as at 20 representing a part of an electrical circuit with a source of current illustrated in the circuit at 22, using the conventional symbol for a storage battery.

The front face 14 also carries indicia representing a switch as at 24 and mounted in the front face 14 is a switch 24' which actually is in circuit with a battery 26 carried within the housing 10 as shown in dotted lines in the lower righthand corner of the housing 10, or with any other appropriate power supply.

About the periphery of the front face of the disc 18 is a plurality of groups of indicia representing standard electrical components, in this case illustrated as resistors, as shown in FIG. 3 with two resistors 28 and 30 being illustrated and connected together.

In FIG. 1 the disc 18 can be viewed through the opening 16 and it will be seen that the portion of the disc adjacent the opening 16 has indicia thereon representing a single resistor 32, the disc portion also having indicia representing parts of the circuit 20 as at 34 and 36 in FIG. 1.

Mounted on the back face of the disc 18 are electrical components or resistors 28' and 30' in the portion of the disc 18 adjacent to and on the opposite side from the indicia representing resistors 28 and 30.

Each of the groups of indicia is matched by the actual electrical components represented by the indicia so that as the disc is rotated past the opening 16 each group is illustrated through the opening and at the same time electrical contact is made by means of contact elements 38 secured to the periphery of the disc at spaced intervals therearound.

As shown in dotted lines in FIG. 1 the electrical circuit 40 including the battery 26, or other power supply, and the switch 24 also includes contacts 42 and 44 fabricated of a resilient material such as strip spring copper or the like that maintain contact with the periphery of the disc 18 during its rotation and bringing to the circuit 40 the contacts 38 with whatever electrical components are therebetween when the disc is stopped with the contacts 38 engaged by the contacts 42 and 44.

The disc 18 also carries a microswitch 46 having its actuating arm 48 engageable by block 50, housing 10, so that when the disc 18 is in the position shown in FIG. 2, current flows through the terminal 54 to the terminal 56 and at all other positions of the disc 18, current flows through the terminal 52 to the terminal 56.

This provision of the microswitch 46 prevents any of the resistors other than the one being tested from being in parallel circuit with the one being tested. In place of the microswitch arrangement for isolating the other resistors, one contact 38 may be split to have two sections with the contact 42 engageable with one section in one position of the disc 18 and with the contact 44 engageable with the other section at a second position of the disc 18.

Mounted in one corner of the housing 10 adjacent the upper end thereof is a milliammeter designated by the numeral 58. Opposite in the other corner is a voltmeter 60. A probe wire for each side of the voltmeter projects from the front face and terminates in a probe, the wires and probes being designated by the numerals 62 and 64, respectively.

Connected to the milliammeter and projecting outwardly of the front face 14 of the housing 10 is a cable 66 having two wires and which terminates in a conventional plug 68.

The disc 18 is provided at appropriate points with plug jacks 70 which receive the plug 68 when the latter is inserted through the opening 16, the plug jack and plug being of the type that the circuit is broken when the plug 68 is inserted in the jack 70, and the milliammeter is then connected in the circuit so that said current at that point may be measured.

The use of the teaching aid according to the present invention should be obvious. Any set of electrical components besides resistors may be mounted on the disc one side with the indicia representing such components on the other side and viewable through the opening 16. Upon closing of the main switch 24' the circuit 40 is connected to the battery 26, or other power supply, and any set or group of resistors energized by the contacts 38 can be tested and their values illustrated by the use of the voltmeter 60 or the milliammeter 58. The probes 64 may be used in any place on the circuit to show voltage drops due to the values of the resistors and the milliammeter will show current flow through any point in the circuit as illustrated by the indicia on one side and represented by the actual electrical components on the other side of the disc.

It is to be understood that other electrical components may be substituted for the resistors shown and described and that the circuit may be broadened or narrowed to include other testing devices as well as those shown. Numerous changes may be made and modifications may be made which are within the spirit of the invention as set forth in the appended claims.

What is claimed is:

1. A teaching aid comprising a housing having a front face provided with an opening, means in said housing mounting a plurality of groups of electronic components, each group in circuit form for selectively positioning a group opposite said opening for viewing of said group, means for supplying electric current to each group successively when opposite said opening, and means carried by said first-named means adjacent each group for connecting a test instrument in circuit with the group opposite said opening and in circuit with a source of electric current.

2. The apparatus according to claim 1 in which the last-named means includes plugs and plug jacks.

3. A teaching aid comprising a housing having a front face provided with an opening, a disc having a front face and a back face, and having a portion of the periphery thereof adjacent said opening for viewing of a portion of the front face, said disc being rotatably mounted in said housing, said disc front face bearing indicia in groups illustrating parts of an electrical circuit, other indicia on said housing front face illustrating the remainder part of the electrical circuit, a plurality of groups of electrical components mounted on the back face of said disc, each group of components being adjacent an indicia group on the front face and of a value and characteristic represented by said indicia group, contact means on said disc for connecting in turn each of said group of components in circuit with a source of electrical energy, and means for connecting a test instrument into said circuit.

4. The apparatus in accordance with claim 3 in which the last-named means includes plugs and jacks.

5. A teaching aid comprising a housing having a front face provided with an opening, a disc having a front face and a back face and having a portion of the periphery thereof adjacent said opening for viewing of a portion of the front face of said disc, said disc being rotatably mounted in said housing, said disc front face bearing indicia in groups illustrating parts of an electrical circuit, other indicia on said housing front face illustrating the remainder part of the electrical circuit, a plurality of groups of electrical components mounted on the back face of said disc, each group being adjacent an indicia group on the front face, and of a value and characteristic represented by said indicia group, a source of electrical energy carried by said housing, an electrical circuit in said housing including said current source, and contact means on said disc for connecting in turn each of said groups of components with said circuit, said circuit including plug jacks for the insertion of plugs connected to test instruments.

References Cited by the Examiner
UNITED STATES PATENTS
2,374,800   5/1945   Bohlke _____ 35—19

EUGENE R. CAPOZIO, *Primary Examiner.*

H. S. SKOGQUIST, *Assistant Examiner.*